(12) United States Patent  
Shu et al.

(10) Patent No.: US 11,899,939 B2  
(45) Date of Patent: Feb. 13, 2024

(54) READ/WRITE REQUEST PROCESSING METHOD AND APPARATUS, ELECTRONIC DEVICE, AND STORAGE MEDIUM

(71) Applicants: Huawei Technologies Co., Ltd., Shenzhen (CN); TSINGHUA UNIVERSITY, Beijing (CN)

(72) Inventors: Jiwu Shu, Beijing (CN); Youmin Chen, Beijing (CN); Youyou Lu, Beijing (CN); Wenlin Cui, Chengdu (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 287 days.

(21) Appl. No.: 17/372,250

(22) Filed: Jul. 9, 2021

(65) Prior Publication Data

US 2021/0334011 A1 Oct. 28, 2021

Related U.S. Application Data

(63) Continuation of application No. PCT/CN2019/127243, filed on Dec. 21, 2019.

(30) Foreign Application Priority Data

Jan. 10, 2019 (CN) .......................... 201910024624.X

(51) Int. Cl.  
*G06F 3/06* (2006.01)

(52) U.S. Cl.  
CPC .......... *G06F 3/0613* (2013.01); *G06F 3/0604* (2013.01); *G06F 3/067* (2013.01); *G06F 3/0659* (2013.01)

(58) Field of Classification Search  
CPC .... G06F 3/0613; G06F 3/0604; G06F 3/0659; G06F 3/067  
See application file for complete search history.

(56) References Cited

U.S. PATENT DOCUMENTS 6,301,616 B1 10/2001 Pal et al.  
2003/0037091 A1\* 2/2003 Nishimura ............ G06F 9/4881  
718/103

(Continued)

FOREIGN PATENT DOCUMENTS

CN 101202973 A 6/2008  
CN 101778092 A 7/2010

(Continued)

OTHER PUBLICATIONS

Nanavati, Mihir, Jake Wires, and Andrew Warfield. "Decibel: Isolation and sharing in disaggregated {Rack-Scale} storage." 14th USENIX Symposium on Networked Systems Design and Implementation (NSDI 17). 2017. (Year: 2017).\*

*Primary Examiner* — Nicholas J Simonetti  
(74) *Attorney, Agent, or Firm* — Leydig, Voit & Mayer, Ltd.

(57) ABSTRACT

A read/write request processing method and server are provided. In this method, each terminal is grouped, and different service durations are assigned for all terminal groups, so that a server can process, within any service duration, only a read/write request sent by a terminal in a terminal group corresponding to the service duration. According to the application, a cache area of a network interface card of the server is enabled to store only limited quantities of queue pairs (QPs) and work queue elements (WQEs), thereby preventing uneven resource distribution in the cache area of the network interface card.

16 Claims, 4 Drawing Sheets

(56) References Cited

U.S. PATENT DOCUMENTS

| | | | |
|---|---|---|---|
| 2006/0206887 A1 | 9/2006 | Dodge et al. | |
| 2013/0148607 A1* | 6/2013 | Yu | H04W 72/51 |
| | | | 370/329 |
| 2013/0219404 A1 | 8/2013 | Yang | |
| 2014/0348087 A1* | 11/2014 | Wu | H04W 72/04 |
| | | | 370/329 |
| 2015/0139153 A1* | 5/2015 | Zhang | H04W 4/70 |
| | | | 370/329 |
| 2016/0050684 A1* | 2/2016 | Ni | H04W 72/12 |
| | | | 370/329 |
| 2017/0255496 A1 | 9/2017 | Deng et al. | |
| 2019/0050261 A1 | 2/2019 | Schmisseur et al. | |
| 2019/0057047 A1* | 2/2019 | Hsu | G06F 13/18 |

FOREIGN PATENT DOCUMENTS

| | | |
|---|---|---|
| CN | 102958099 A | 3/2013 |
| CN | 103516761 A | 1/2014 |
| CN | 105743713 A | 7/2016 |
| CN | 107422986 A | 12/2017 |
| CN | 109885393 A | 6/2019 |
| IN | 107306294 A | 10/2017 |

\* cited by examiner

READ/WRITE REQUEST PROCESSING METHOD AND APPARATUS, ELECTRONIC DEVICE, AND STORAGE MEDIUM

CROSS-REFERENCE TO RELATED APPLICATION

This application is a continuation of International Application No. PCT/CN2019/127243, filed on Dec. 21, 2019, which claims priority to China Patent Application No. 201910024624.X, filed on Jan. 10, 2019. The disclosures of the aforementioned applications are hereby incorporated by reference in their entireties.

TECHNICAL FIELD

Embodiments of the present disclosure relate to the field of data processing technologies, and in particular, to a read/write request processing method and apparatus, an electronic device, and a storage medium.

BACKGROUND

Remote direct memory access (RDMA) can quickly migrate data from one system into a memory of a remote system through a network without exerting any impact on an operating system. Because of low-latency and high-bandwidth characteristics of the RDMA, the RDMA is widely used in a distributed system. A serving end in the distributed system may process a read/write request of a client through an RDMA network interface card, so that the serving end can directly write data in the read/write request into a memory of the serving end, or directly send data in a memory of the serving end to the client.

Currently, a serving end may process a read/write request through the following procedure: A cache area of an RDMA network interface card of the serving end is divided into a plurality of subcache areas. After a client establishes a communication connection to the serving end, the serving end creates and initializes queue pairs (QPs) on a subcache area corresponding to the RDMA network interface card thereof, where each QP includes a send queue (SQ) and a receive queue (RQ), and registers a work queue element (WQE) in the RQ of the QP, where the WQE is used for indicating a storage location in a memory of the serving end. When the client sends a read/write request to the RDMA network interface card of the serving end, the serving end may determine, based on an SQ corresponding to the client in the QPs, an RQ corresponding to the SQ, so that a WQE can be determined in the RQ. Further, when the read/write request is a read request, the serving end may directly send data at a storage location indicated by the WQE to the client, and when the read/write request is a write request, the serving end may directly write to-be-written data in the write request at the storage location indicated by the WQE.

In the foregoing process in which the serving end processes a read/write request, the subcache areas of the RDMA network interface card of the serving end may store SQs and WQEs. When a quantity of clients that the subcache area is in charge of is increased, the subcache area needs to store a large quantity of SQs and a large quantity of WQEs, when a memory of the subcache area is relatively small, the subcache area possibly cannot store the large quantity of SQs and the large quantity of WQEs. When the memory of the subcache area is relatively large, after storing all of the SQs and the WQEs, the subcache area may possibly have vacant memory that is not used, resulting in a waste of subcache area resources. Therefore, dividing a cache area for an RDMA network interface card of a serving end may cause a problem that cache area resources of the RDMA network interface card are unevenly distributed.

SUMMARY

Embodiments of the present disclosure provide a read/write request processing method and apparatus, an electronic device, and a storage medium, to resolve a problem of uneven distribution of cache area resources of a network interface card. The technical solutions are as follows:

According to a first aspect, a read/write request processing method is provided, where the method is performed by a server and includes:

grouping a plurality of terminals, to obtain a plurality of terminal groups, where each terminal group includes at least one terminal, and the plurality of terminals are connected to the server;

assigning a corresponding service duration to each terminal group; and processing, within any service duration, a read/write request sent by a terminal in a terminal group corresponding to the service duration, and skipping processing a read/write request sent by a terminal in a terminal group corresponding to another service duration.

In a possible implementation, the grouping a plurality of terminals includes:

determining priorities of the plurality of terminals; and assigning terminals having a same priority into one terminal group, where each terminal group corresponds to one priority.

In a possible implementation, the determining priorities of the plurality of terminals include:

obtaining throughputs of the plurality of terminals within a preset time and an average data volume of read/write requests of each terminal; and determining a priority of each terminal based on the throughput of the terminal and the average data volume of the read/write requests of the terminal.

In a possible implementation, the determining a priority of each terminal based on the throughput of the terminal and the average data volume of the read/write requests of the terminal includes:

determining the priority of the terminal based on a weight parameter of the terminal, the throughput of the terminal, and the average data volume of the read/write requests of the terminal.

Based on the foregoing possible implementations, a priority may be assigned for each terminal, and a weight parameter is added, to elevate a priority of a terminal undertaking an important service, so that the server can focus on the terminal undertaking an important service.

In a possible implementation, after the assigning terminals having a same priority into one terminal group, the method further includes:

determining a preset quantity of terminals of each terminal group based on a priority of the terminal group;

splitting, when a quantity of terminals in the terminal group is greater than the preset quantity of terminals of the terminal group, the terminal group into a plurality of terminal groups; and combining, when a quantity of terminals in the terminal group is less than the preset quantity of terminals of the terminal group, at least one first terminal group with the terminal group, to obtain a second terminal group, where a quantity of terminals in the second terminal group is not greater than a preset quantity of terminals of the second terminal group, a priority of the second terminal group depends on priorities of most terminals in the second terminal group, and a priority of the first terminal group is the same as the priority of the terminal group or a difference between the priority of the first terminal group and the priority of the terminal group is less than a preset value.

In a possible implementation, after the assigning terminals having a same priority into one terminal group, the method further includes:

determining a maximum quantity of terminals of each terminal group based on a processing capacity of the server and a priority of the terminal group;

splitting, when a quantity of terminals in the terminal group is greater than the maximum quantity of terminals of the terminal group, the terminal group into a plurality of terminal groups; and combining, when a quantity of terminals in the terminal group is less than the maximum quantity of terminals of the terminal group, at least one third terminal group with the terminal group, to obtain a fourth terminal group, where a quantity of terminals in the fourth terminal group is not greater than a maximum quantity of terminals of the fourth terminal group, a priority of the fourth terminal group depends on priorities of most terminals in the fourth terminal group, and a priority of the third terminal group is the same as the priority of the terminal group or a difference between the priority of the third terminal group and the priority of the terminal group is less than a preset value.

Based on the foregoing possible implementations, a quantity of terminals in each terminal group is adjusted based on the cache area resources of the network interface card of the server, a CPU resource, and a priority of the terminal group, so that the cache area resources of the network interface card of the server and the CPU resource can be fully used.

In a possible implementation, different service durations are assigned for the terminal groups based on priorities of the terminal groups by using a first preset service duration as a reference duration, where the assigned service durations fall within a present range of the first preset service duration.

In a possible implementation, the processing, within one service duration, a read/write request sent by a terminal in a group corresponding to the service duration includes:

obtaining a to-be-processed terminal group from a wait queue based on a storage sequence in the wait queue, where the wait queue is used to store the terminal groups;

each time a terminal group is obtained, processing a read/write request sent by a terminal in the terminal group within a service duration corresponding to the terminal group; and stopping, after the service duration corresponding to the terminal group elapses, processing a read/write request sent by a terminal in the terminal group, and storing the terminal group at an end of the wait queue.

Based on the foregoing possible implementations, the server may be enabled to only receive a read/write request sent by a terminal of one terminal group, to prevent the server from receiving a large quantity of read/write requests that are sent, and further prevent the large quantity of read/write requests from waiting for processing at the server, thereby achieving traffic limiting.

In a possible implementation, the wait queue is used to store each terminal group based on the priority of the terminal group.

Based on the foregoing possible implementations, a read/write request sent by a terminal in a terminal group having a higher priority may be preferentially processed.

In a possible implementation, the method further includes:

reducing the service duration corresponding to the terminal group when the service duration corresponding to the terminal group satisfies a service processing requirement of the terminal in the terminal group and there is still a remaining duration; and increasing the service duration corresponding to the terminal group when the service duration corresponding to the terminal group does not satisfy a service processing requirement of the terminal in the terminal group.

Based on the foregoing possible implementations, as the server adjusts a service duration corresponding to each terminal group, the server can complete, within the adjusted duration corresponding to the terminal group, processing on a read/write request sent by a terminal in the terminal group, so that the server is not idle, thereby further improving a utilization rate of the server.

In a possible implementation, before the processing, within one service duration, a read/write request sent by a terminal in a terminal group corresponding to the service duration, the method further includes:

sending a response to the terminal in the terminal group corresponding to the service duration, where the response is used to instruct the terminal to send a read/write request to the server.

Based on the foregoing possible implementations, only a terminal that receives a response is enabled to send a read/write request to the server, so that the server is enabled to only receive the read/write request sent by the terminal of the terminal group, to prevent the server from receiving a large quantity of read/write requests that are sent, and further prevent the large quantity of read/write requests from waiting for processing at the server, thereby achieving traffic limiting. In addition, terminals in other terminal groups may be further prevented from sending useless read/write requests, thereby reducing workload of the terminals in the other terminal groups.

In a possible implementation, the method further includes:

storing information about a terminal in each terminal group; and after the server is restarted, processing, based on the stored information about the terminal in each terminal group, a read/write request sent by the terminal in the terminal group.

Based on the foregoing possible implementations, after the server is faulty and is restarted, grouping the terminals again can be avoided. Certainly, the server may periodically store information about a terminal in each terminal group.

In a possible implementation, the method further includes:

storing a priority of each terminal; and grouping the terminal based on the stored priority of the terminal after the server is restarted.

Based on the foregoing possible implementations, after the server is faulty and is restarted, each terminal may be grouped directly based on a stored priority of each terminal without obtaining a priority of the terminal.

According to a second aspect, a read/write request processing apparatus is provided, and is configured to perform the foregoing read/write request processing method. Specifically, the read/write request processing apparatus includes functional modules configured to perform read/write request processing provided in the foregoing first aspect or any implementation of the foregoing first aspect, where the foregoing aspect is an aspect corresponding to a read/write request processing method used in a server.

According to a third aspect, an electronic device is provided, including a processor and a memory, where the memory stores at least one instruction, and the at least one instruction is loaded and executed by the processor to implement operations performed in the read/write request processing method as stated above.

According to a fourth aspect, a computer-readable storage medium is provided, storing at least one instruction, where the at least one instruction is loaded and executed by a processor to implement the operations performed in the read/write request processing method as stated above.

The technical solutions provided in the embodiments of the present disclosure have the following beneficial effects:

Each terminal is grouped, and different service durations are assigned for all terminal groups, so that the server can process, within any service duration, only a read/write request sent by a terminal in a terminal group corresponding to the service duration, so that quantities of QPs and WQEs that are generated based on the read/write request sent by the terminal in the terminal group are limited, thereby enabling a cache area of a network interface card of the server to store only limited quantities of QPs and WQEs, and further preventing a problem of uneven resource distribution from occurring in the cache area of the network interface card.

BRIEF DESCRIPTION OF DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

Figure 1:
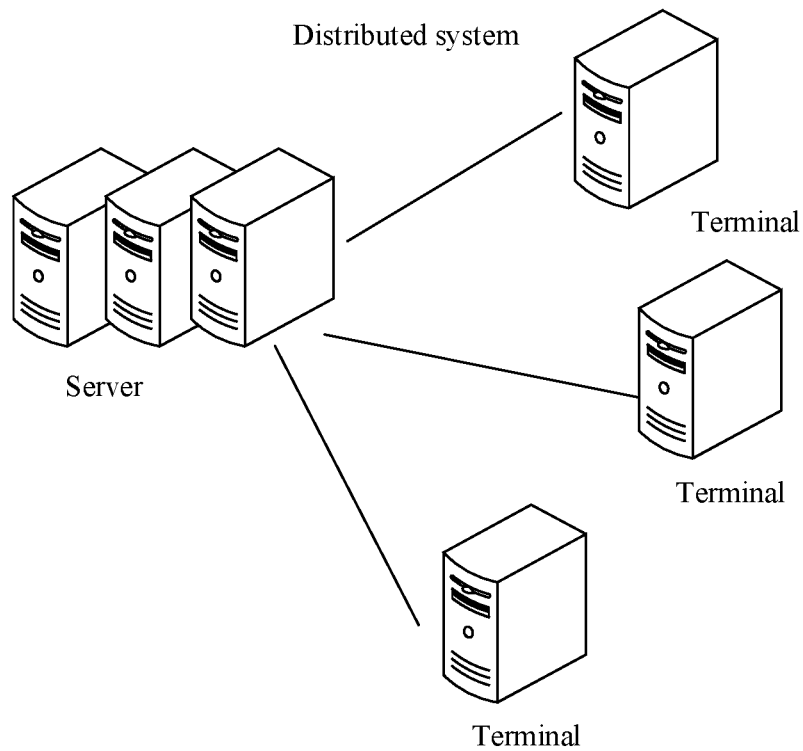
FIG. 1 is a schematic diagram of a distributed system according to an embodiment of the present disclosure.

FIG. 1 is a schematic diagram of a distributed system according to an embodiment of the present disclosure. Referring to FIG. 1, the distributed system includes at least one server and at least one terminal. One server may be connected to a plurality of terminals. A client or an RDMA network interface card may be installed on each terminal. The terminal may send a remote procedure call (RPC) request to the server through the RDMA network interface card. The RPC request may be a data read request or a data write request, so that the terminal may read data from or write data into the server. The RDMA network interface card is a network interface card having an RDMA function, for example, a remote procedure call network interface card (RNIC). The clients may be clients of different organizations or clients of the same organization, and the clients may be responsible for different services.

The server is configured to process the RPC request sent by the terminal. An RDMA network interface card may be installed on the server, so that the server can use the RDMA network interface card to directly process the RPC request sent by the terminal.

Figure 2:
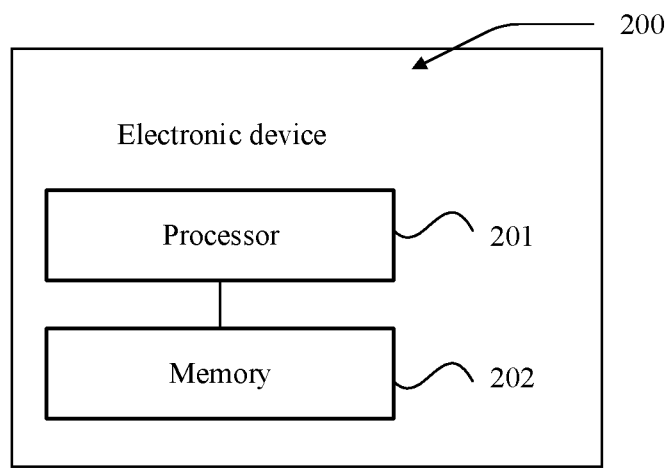
FIG. 2 is a schematic structural diagram of an electronic device according to an embodiment of the present disclosure.

In FIG. 1, the server and the terminal may alternatively be one electronic device. FIG. 2 is a schematic structural diagram of an electronic device according to an embodiment of the present disclosure. An electronic device 200 may vary a lot due to different configurations or performance, and may include one or more central processing units (CPUs) 201 and one or more memories 202. The memory 202 stores at least one instruction. The at least one instruction is loaded and executed by the processor 201 to implement the method provided in the following method embodiments. Certainly, the electronic device 200 may further include components such as a wired or wireless network interface, a keyboard, and an input/output (I/O) interface, to facilitate input and output. The electronic device 200 may further include another component configured to implement a function of a device. Details are not further described herein.

In an example embodiment, a computer-readable storage medium, for example, a memory including an instruction, is further provided, and the instruction may be executed by a processor in an electronic device to complete processing on the read/write request processing method in the following embodiments. For example, the computer-readable storage medium may be a read-only memory (ROM), a random access memory (RAM), a compact disc read-only memory (CD-ROM), a magnetic tape, a floppy disk, an optical data storage device, and the like.

Figure 3:
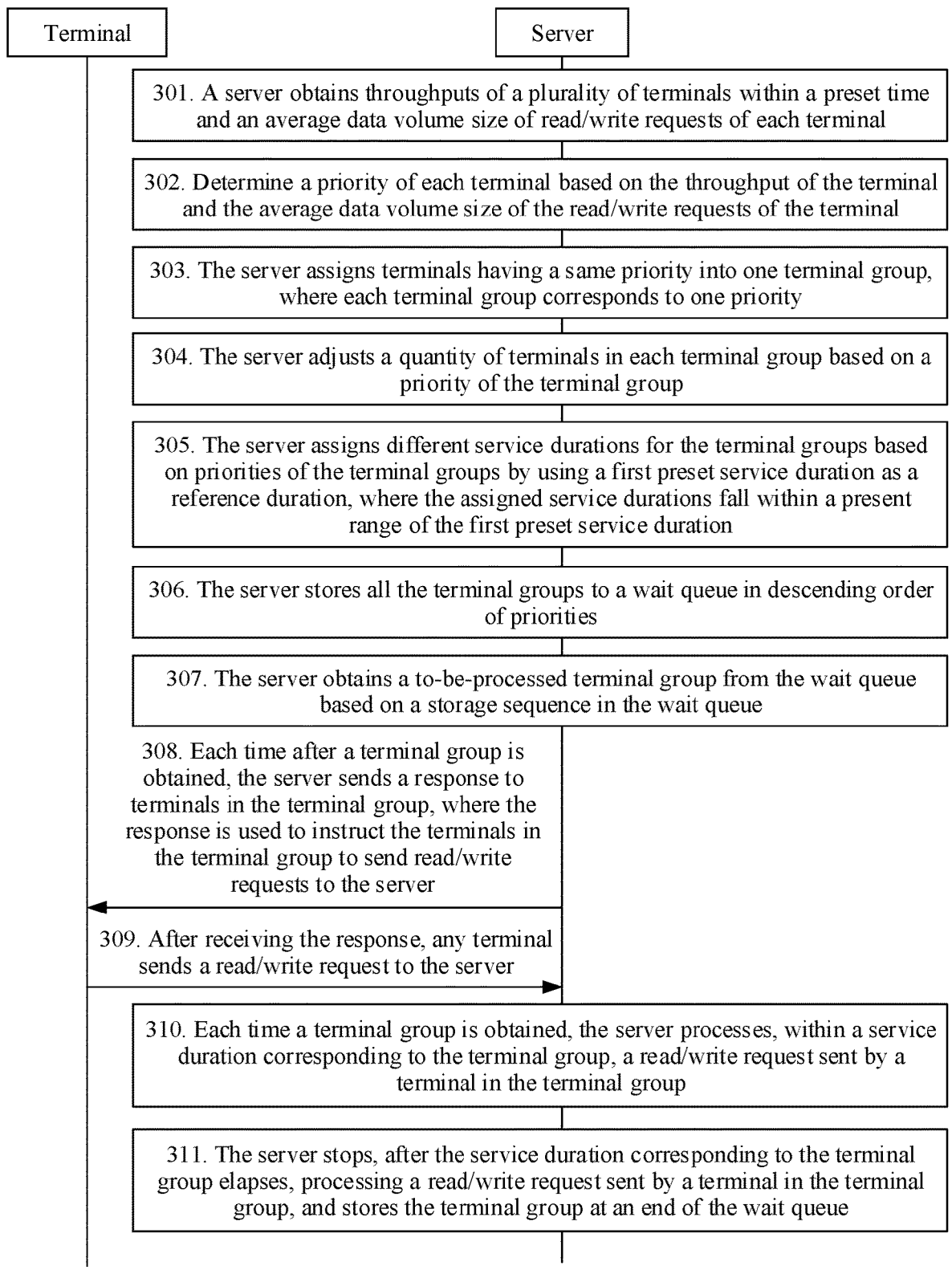
FIG. 3 is a flowchart of a read/write request processing method according to an embodiment of the present disclosure.

The foregoing is a description of the distributed system and the terminal. To further present a procedure in which the server processes a read/write request, refer to FIG. 3. FIG. 3 is a flowchart of a read/write request processing method according to an embodiment of the present disclosure. The method specifically includes the following steps.

301. A server obtains throughputs of a plurality of terminals within a preset time and an average data volume of read/write requests of each terminal.

The server may be a terminal of a serving end, the plurality of terminals are devices connected to the server, and a client may be installed on each terminal. A read/write request may be an RPC request. When a read/write request is a read request, a data volume of the read/write request is a data volume of to-be-read data, and when a read/write request is a write request, a data volume of the read/write request is a data volume of to-be-written data.

An average data volume of read/write requests of each terminal may be determined through the following procedure: When a data volume of the $j^{th}$ read/write request sent by any terminal i to the server is $N_j$, and a quantity of read/write requests sent by the terminal to the server is $x_i$ within the preset time, an average data volume $S_i$ of the read/write requests of the terminal i may be represented as:

$$S_i = \frac{\sum_{j=1}^{j=x_i} N_j}{x_i}$$

where i, j, N, and x are positive integers.

In a possible implementation, after each terminal establishes a connection to the server, the terminal may send a read/write request to the server, and further, within the preset time, based on read/write requests sent by the terminal and received by the server, the server may obtain a throughput of the terminal and an average data volume of the read/write requests of the terminal. It should be noted that the preset time is not specifically limited in this embodiment of the present disclosure.

302. Determine a priority of each terminal based on the throughput of the terminal and the average data volume of the read/write requests of the terminal.

In a possible implementation, for a terminal, it is obtained that a throughput of the terminal i within a preset time is $T_i$, and an average data volume of read/write requests is $S_i$, a priority $P_i$ of the terminal i may be represented as $P_i=T_i \div S_i$. Therefore, a terminal having a higher priority is more likely to send read/write requests more frequently while bearing less payload.

In a possible implementation, because services that terminals are responsible for may be different, in the foregoing implementation, terminals that are responsible for different services may have a same priority. In a possible implementation, the terminal determines a priority of each terminal based on a weight parameter assigned for the terminal, the throughput of the terminal, and an average data volume of read/write requests of the terminal. For example, terminals having the same throughput and the same average data volume of read/write requests may be enabled by introducing a weight parameter to have different priorities, that is, $P_i=(T_i \div S_i)*W_i$, Where $W_i$ is a weight parameter assigned by the server for the terminal i. The server may assign a greater weight parameter for a terminal that is responsible for an important service and assign a less weight parameter for a terminal that is responsible for an ordinary service, so that the terminal that is responsible for an important service may be ensured to have a higher priority, and further, the server can preferentially process a read/write request sent by the terminal that is responsible for an important service.

In the foregoing two possible implementations, a calculated difference between priorities $P_i$ of different terminals may be relatively small, and the terminal may consider priorities $P_i$ having a relatively small difference as a same priority. The difference is less than a first preset value. The first preset value is not specifically limited in this embodiment of the present disclosure.

In a possible implementation, a priority corresponding to each value range of a priority of each terminal is determined based on a value range of $P_i$, and the server determines, based on $P_i$ of each terminal, a value range of $P_i$ of the terminal; and a priority corresponding to a value range of $P_i$ of each terminal is a priority of the terminal. Specifically, a preset quantity of priorities may be divided. Using an example in which five priorities are divided, the five priorities are a priority 1, a priority 2, a priority 3, a priority 4, and a priority 5 in ascending order, and each priority has a relative priority $M_y$, where $M_y$ is a relative priority of a priority y (y=1, 2, 3). When a difference between $P_i$ and $M_y$ is less than the first preset value, a priority of the terminal i is determined as a priority y, and the difference between $P_i$ and $M_y$ being less than the first preset value may indicate that $P_i$ falls within a value range corresponding to the priority y. For example, when differences between $P_1$ to $P_3$ and $M_5$ are less than the first preset value, priorities of terminals 1 to 3 are the priority 5. In this embodiment of the present disclosure, division of priorities is not specifically limited, and a value range corresponding to each priority and a relative priority of each priority are not specifically limited.

303. The server assigns terminals having a same priority into one terminal group, where each terminal group corresponds to one priority.

In a possible implementation, still using the example in step 302 as an example, when the terminal divides priorities 1 to 5, each priority respectively corresponds to a terminal group. That is, the priority 1 corresponds to a terminal group 1, the priority 2 corresponds to a terminal group 2, the priority 3 corresponds to a terminal group 3, the priority 4 corresponds to a terminal group 4, and the priority 5 corresponds to a terminal group 5. When priorities of terminals 1 to 3 are the priority 5, the terminals 1 to 3 are assigned into the terminal group 5.

In a possible implementation, each terminal group may further correspond to a terminal table, the terminal table may store information about a terminal in the terminal group, and the information about the terminal may be an Internet Protocol (IP) address of the terminal. Based on the foregoing example in step 303, a terminal table of the terminal group 5 stores an IP address of the terminal 1, an IP address of the terminal 2, and an IP address of the terminal 3. Certainly, the information about the terminal may alternatively be other information identifying the terminal. The information about the terminal is not specifically limited in this embodiment of the present disclosure.

304. The server adjusts a quantity of terminals in each terminal group based on a priority of the terminal group.

In a possible implementation, step 304 may be implemented through the procedure shown in steps 304A to 304C.

Step 304A. Determining a preset quantity of terminals of each terminal group based on a priority of the terminal group.

In a possible implementation, a preset quantity of terminals of a terminal group having a higher priority is smaller, and a preset quantity of terminals of a terminal group having a lower priority is larger. Still using the example in step 303 as an example, a preset quantity of terminals of the terminal group 1 is 10, a preset quantity of terminals of the terminal group 2 is 8, a preset quantity of terminals of the terminal group 3 is 6, a preset quantity of terminals of the terminal group 4 is 4, and a preset quantity of terminals of the terminal group 5 is 2.

Step 304B. Split, when a quantity of terminals in the terminal group is greater than the preset quantity of terminals of the terminal group, the terminal group into a plurality of terminal groups.

In a possible implementation, still using the example in step 304A as an example, the preset quantity of terminals of the terminal group 5 is 2. Currently, there are terminals 1 to 3 in the terminal group 5. In view of this, a quantity (3) of terminals in the terminal group 5 is greater than the preset quantity (2) of terminals of the terminal group 5. Therefore, the terminal group 5 may be split, to obtain a terminal group 5.1 and a terminal group 5.2. The terminal group 5.1 includes two terminals, and the terminal group 5.2 includes one terminal. The server may assign any terminal in the terminal group 5 to the terminal group 5.2, or may assign a terminal having the highest $P_i$ to the terminal group 5.2, or may assign a terminal having the lowest $P_i$ to the terminal group 5.2. Which terminal is split from the terminal group is not specifically limited in this embodiment of the present disclosure.

In a possible implementation, still using the example in step 304A as an example, a preset quantity of terminals of the terminal group 5 is 1. Currently, there are terminals 1 to 3 in the terminal group 5. In view of this, a quantity (3) of terminals in the terminal group 5 is greater than the preset quantity (1) of terminals of the terminal group 5. Therefore, the server splits the terminal group 5, to obtain a terminal group 5.3, a terminal group 5.4, and a terminal group 5.5. The terminal group 5.3, the terminal group 5.4, and the terminal group 5.5 separately have one terminal.

It should be noted that a priority of a terminal group obtained through splitting is unchanged. That is, a priority of a terminal group obtained through splitting is the same as a priority of a terminal group before splitting. In addition, a preset quantity of terminals of each terminal group is not specifically limited in this embodiment of the present disclosure.

Step 304C. Combine, when a quantity of terminals in the terminal group is less than the preset quantity of terminals of the terminal group, at least one first terminal group with the terminal group, to obtain a second terminal group, where a quantity of terminals in the second terminal group is not greater than a preset quantity of terminals of the second terminal group, a priority of the second terminal group depends on priorities of most terminals in the second terminal group, and a priority of the first terminal group is the same as the priority of the terminal group or a difference between the priority of the first terminal group and the priority of the terminal group is less than a preset value.

Still using the example in step 304A as an example, a preset quantity of terminals assigned to the terminal group 4 is 4, and the terminal group 4 of which a priority is 4 currently includes a terminal 4 and a terminal 5. It can be learned that a quantity (2) of terminals in the terminal group 4 is less than the preset quantity (4) of terminals of the terminal group 4. Therefore, the terminal group 4 may be combined with another terminal group to obtain a new terminal group 4 while making a quantity of terminals in the new terminal group 4 not greater than 4. The new terminal group 4 is a second terminal group. For example, the terminal group 4 is combined with the terminal group 5.2 in step 301B to obtain a new terminal group 4, and the new terminal group 4 includes the two terminals in the terminal group 4 and the one terminal in the terminal group 5.2, so that the new terminal group 4 includes three terminals. In view of the above, the quantity of terminals in the new terminal group 4 still does not reach the preset quantity (4) of terminals of the terminal group 4. Therefore, the terminal group 4 may be further combined with another terminal group. A priority of the another terminal group may be the same as the priority of the terminal group 4, or a difference between the priority of the another terminal group and the priority of the terminal group 4 is less than a preset value. For example, when the preset value is 2, the new terminal group 4 may be combined with a terminal group of which a priority is 5, 4, 3, or 2 provided that a quantity of terminals in a terminal group after combination does not exceed a maximum quantity of terminals, that is, 4. A preset value of the priority difference is not specifically limited in this embodiment of the present disclosure.

It should be noted that a priority of a terminal group after combination needs to be re-determined. After a combined terminal group is obtained, a priority of the combined terminal group needs to be determined based on priorities of most terminals in the combined terminal group. For example, when a combined terminal group includes a terminal 8, a terminal 9, and a terminal 10, priorities of the terminal 8 and the terminal 9 are both 3, and a priority of the terminal 10 is 4, a priority of the combined terminal group is 3.

In consideration of a cache size of a network interface card and a processing capacity of a CPU of the server, the server can process, at the same time, only read/write requests sent by a specific quantity of terminals. After the server groups terminals, a quantity of terminals in a terminal group may be relatively large, resulting in that the server cannot process, at the same time, read/write requests sent by the terminals in the terminal group. Certainly, the quantity of the terminals in the terminal group may be relatively small. Therefore, the server may adjust a quantity of terminals in each terminal group based on a cache resource of the network interface card and a CPU resource of the server, to maximize utilization of the cache resources of the network interface care and the CPU resource. The network interface card may be an RDMA network interface card.

In a possible implementation, the server may alternatively adjust each terminal group based on a processing capacity of the server. Refer to a procedure of adjusting each terminal group based on the processing capacity of the server shown below in steps 304D to 304F.

Step 304D. The terminal determines a maximum quantity of terminals of each terminal group based on a processing capacity of the server and a priority of the terminal group.

A maximum quantity of terminals of a terminal group is a quantity of terminals that one terminal group can accommodate at most, or is a maximum quantity of terminals from which read/write requests that can be processed by the terminal within a specific time are sent. A maximum quantity of terminals of each terminal group may depend on two factors. The first factor is the cache resource of the network interface card and the CPU resource of the server, and the second factor is a priority of the terminal group. When the priority of the terminal group is determined, when the cache resource of the network interface card and the CPU resource of the server are larger, the maximum quantity of terminals of the terminal group is larger. Otherwise, the maximum quantity of terminals of the terminal group is smaller. When the cache resource of the network interface card and the CPU resource of the server are determined, when the priority of the terminal group is higher, the maximum quantity of terminals of the terminal group is larger. Otherwise, the maximum quantity of terminals of the terminal group is smaller.

Step 304E. The server splits, when a quantity of terminals in the terminal group is greater than the maximum quantity of terminals of the terminal group, the terminal group into a plurality of terminal groups.

When splitting the terminal group, the server splits, based on the maximum quantity of terminals of the terminal group, the terminal group into at least one terminal group including terminals of which a quantity is the maximum quantity of terminals and at least one terminal group including terminals of which a quantity is less than the maximum quantity of terminals. A specific splitting procedure is similar to a manner in which the server performs splitting in step 304B.

A specific procedure in which the server splits the group is not described herein again in this embodiment of the present disclosure.

Step 304F. The server combines, when a quantity of terminals in the terminal group is less than the maximum quantity of terminals of the terminal group, at least one third terminal group with the terminal group, to obtain a fourth terminal group, where a quantity of terminals in the fourth terminal group is not greater than a maximum quantity of terminals of the fourth terminal group, a priority of the fourth terminal group depends on priorities of most terminals in the fourth terminal group, and a priority of the third terminal group is the same as the priority of the terminal group or a difference between the priority of the third terminal group and the priority of the terminal group is less than a preset value.

A manner in which the server combines the terminal group with the at least one third terminal group is similar to the manner in which the server combines the terminal groups in step 304C. The manner in which the server combines the terminal group with the at least one third terminal group is not described herein again in this embodiment of the present disclosure.

305. The server assigns different service durations for the terminal groups based on priorities of the terminal groups by using a first preset service duration as a reference duration, where the assigned service durations fall within a present range of the first preset service duration.

The preset range of the first preset service duration may be a duration range less than the first preset service duration, or may be a duration range greater than the first preset service duration. For example, when the first preset duration is 20 minutes, the preset range of the first preset service duration may be from 0 to 40 minutes. The preset range of the first preset service duration is not specifically limited in this embodiment of the present disclosure.

For a terminal group having a higher priority, a longer service duration is assigned, and for a terminal group having a lower priority, a shorter service duration is assigned. In a possible implementation, based on a priority, a fixed duration is added to or a fixed duration is subtracted from the first service duration, to assign different service durations for all terminal groups. Specifically, still using the embodiment of step 303 as an example, the priority 1 corresponds to the terminal group 1, the priority 2 corresponds to the terminal group 2, the priority 3 corresponds to the terminal group 3, the priority 4 corresponds to the terminal group 4, and the priority 5 corresponds to the terminal group 5. When the server uses the first service duration as a service duration of the terminal group 3, the server may add a fixed duration 1 to the first preset service duration to obtain a service duration 4 of the terminal group 4, or may add a fixed duration 2 to the first preset service duration to obtain a service duration 5 of the terminal group 5, where the duration 2 may be greater than the duration 1, so that the service duration 5 of the terminal group 5 is greater than the service duration 4 of the terminal group 4. The server may alternatively subtract a fixed duration 3 from the first preset service duration to obtain a service duration 1 of the terminal group 2 or may subtract a fixed duration 4 from the first preset service duration to obtain a service duration 1 of the terminal group 1, where the duration 4 may be greater than the duration 3, so that the service duration 2 of the terminal group 2 is greater than the service duration 1 of the terminal group 1. Further, a service duration of each terminal group may be obtained by using a fixed duration and the first service duration. In addition, the foregoing fixed durations are not specifically limited in this embodiment of the present disclosure.

It should be noted that in a possible implementation, the server may alternatively group the terminals directly instead of grouping the terminals based on the priorities. For example, the server may randomly group the terminals.

306. The server stores all the terminal groups to a wait queue in descending order of priorities.

In the wait queue, a terminal group closer to the head of the queue has a higher priority. To be specific, in a subsequent processing procedure, read/write requests sent by terminals in a terminal group closer to the head of the queue are processed by the server more preferentially. Storage based on priorities enables the server to obtain all the terminal groups from the wait queue in a subsequent processing procedure and sequentially process, based on a sequence of the terminal groups in the wait queue, read/write requests sent by terminals in the terminal groups.

It should be noted that in a possible implementation, when the terminal groups are not grouped based on priorities, the server does not need to sort a storage sequence of the terminal groups in the wait queue. For example, the server may first store the terminal group 2 in the wait queue, and then store the terminal group 5 in the wait queue.

307. The server obtains a to-be-processed terminal group from the wait queue based on a storage sequence in the wait queue.

Figure 4:
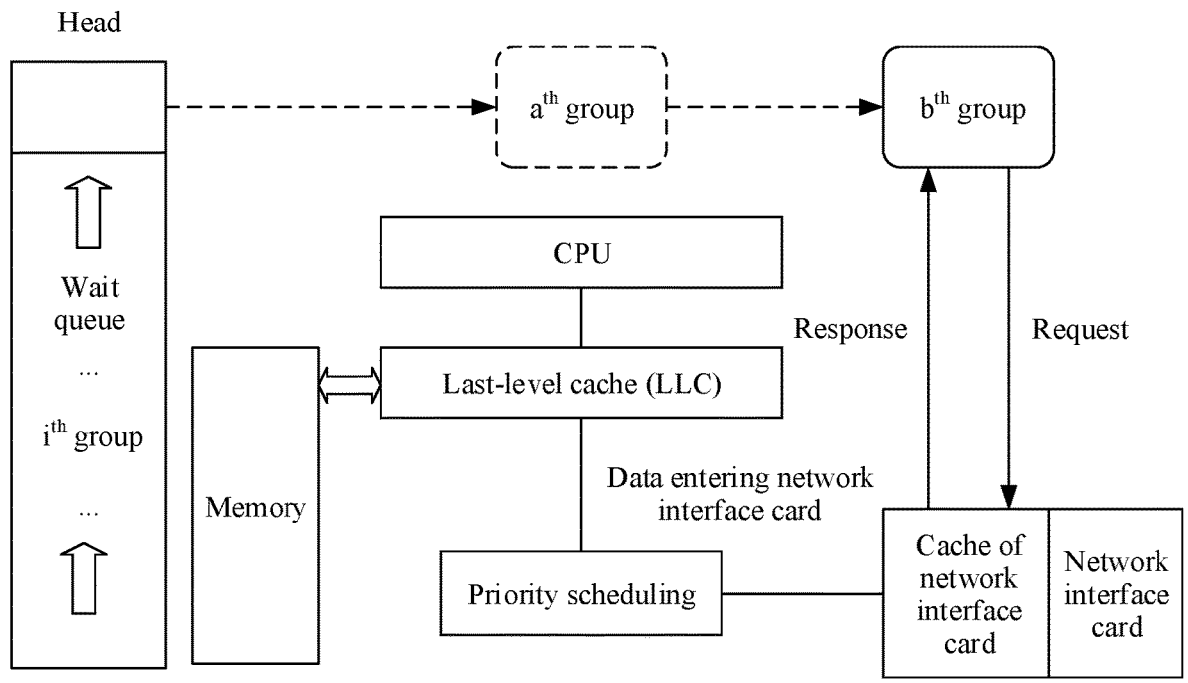
FIG. 4 is a schematic diagram of a procedure of processing a read/write request according to an embodiment of the present disclosure.

In a possible implementation, FIG. 4 is a schematic diagram of a procedure of processing a read/write request according to an embodiment of the present disclosure. It can be learned from FIG. 4 that all terminal groups are arranged in the wait queue. The $b^{th}$ group is located at the queue head of the wait queue, the server may obtain the $b^{th}$ group, and the $b^{th}$ group is the to-be-processed terminal group.

308. Each time after a terminal group is obtained, the server sends a response to terminals in the terminal group, where the response is used to instruct the terminals in the terminal group to send read/write requests to the server.

The server may obtain information about the terminals in the obtained terminal group from a terminal table corresponding to the terminal group, and further, the server may send a response to the terminals in the terminal group. Using an example in which the obtained terminal group is the terminal group 5, the terminal group 5 includes terminals 1 to 3. In the terminal table corresponding to the terminal group 5, the server obtains IP addresses of the terminals 1 to 3, and the server may send a response to the terminals 1 to 3 based on the IP addresses of the terminals 1 to 3.

By instructing terminals in a terminal group, the server can be enabled to only receive read/write requests sent by the terminals of the terminal group, to prevent the server from receiving a large quantity of read/write requests that are sent, and further prevent the large quantity of read/write requests from waiting for processing at the server, thereby achieving traffic limiting. In addition, other terminals that do not receive the response do not need to send a read/write request, thereby reducing workload of the other terminals.

309. After receiving the response, any terminal sends a read/write request to the server.

310. Each time a terminal group is obtained, the server processes, within a service duration corresponding to the terminal group, a read/write request sent by a terminal in the terminal group.

Figure 5:
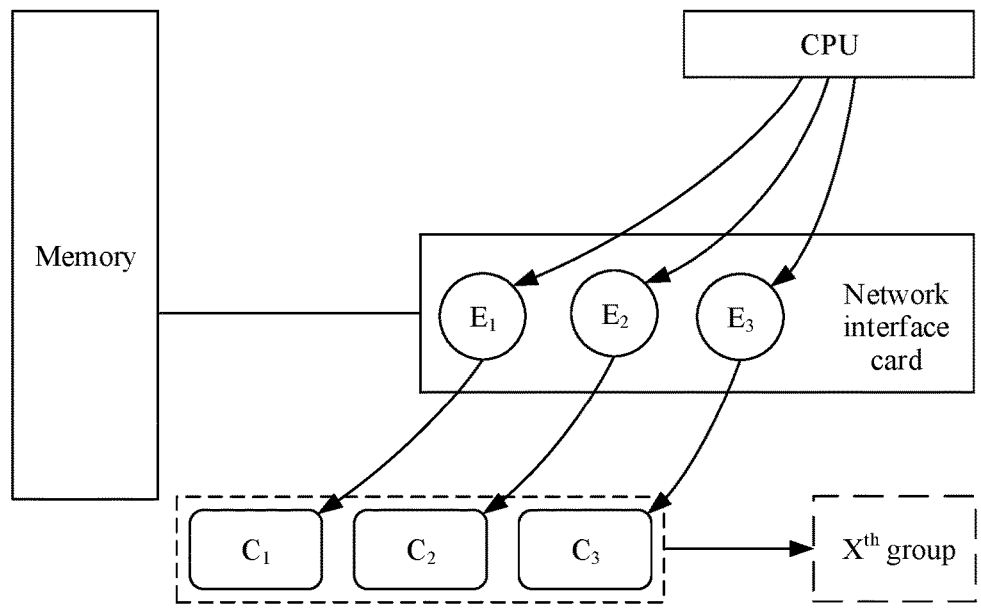
FIG. 5 is a schematic diagram of a read/write request processing method according to an embodiment of the present disclosure.

In a possible implementation, terminals in a same terminal group may simultaneously send read/write requests to the server. After the server receives the read/write requests sent by the terminals in the same terminal group, a working thread of the server processes the read/write requests in a polling manner. Specifically, FIG. 5 is a schematic diagram of a read/write request processing method according to an embodiment of the present disclosure. The terminal group is the $X^{th}$ group, and the $X^{th}$ group includes three terminals $C_1$, $C_2$, and $C_3$. After receiving a data read/write request 1 sent by the terminal $C_1$, a data read/write request 2 sent by the terminal $C_2$, and a data read/write request 3 sent by the terminal $C_3$, the CPU of the server sends the data read/write requests 1 to 3 to the network interface card of the server. A corresponding QP and a corresponding WQE are generated in a cache area of the network interface card based on the read/write data request 1, where the QP and the WQE that are generated based on the read/write request sent by the terminal $C_1$ may be represented by metadata $E_1$, that is, $E_1$ corresponds to the terminal $C_1$. A corresponding QP and a corresponding WQE are generated in the cache area of the network interface card based on the read/write data request 2, where the QP and the WQE that are generated based on the read/write request sent by the terminal $C_2$ may be represented by metadata $E_2$, that is, $E_2$ corresponds to the terminal $C_2$. A corresponding QP and a corresponding WQE are generated in the cache area of the network interface card based on the read/write data request 3, where the QP and the WQE that are generated based on the read/write request sent by the terminal $C_3$ may be represented by metadata $E_3$, that is, $E_3$ corresponds to the terminal $C_3$. Subsequently, the server may process each read/write request based on a WQE corresponding to the read/write request. Because the server needs to process a plurality of read/write requests within a preset service duration, a working thread of the server may process the read/write requests in a polling manner. It should be noted that an arrow direction in FIG. 5 is not used to indicate a transmission direction of a read/write request, and is only used to indicate a corresponding logical relationship.

It should be noted that the server processes, within any service duration, only a read/write request sent by a terminal in a terminal group corresponding to the service duration without processing a read/write request sent by a terminal in another terminal group. For example, a service duration of the terminal group 5 is 20 minutes. When the server obtains the terminal group 5 from the wait queue, the server stops obtaining another terminal group from the wait queue, and within 20 minutes after obtaining the terminal group 5, the server processes only a read/write request sent by a terminal in the terminal group 5 without processing a read/write request sent by a terminal in another terminal group.

An example in which the network interface card is an RDMA network interface card is used. Because during grouping, the size of the cache area of the RDMA network interface card and the processing capacity of the CPU of the server are considered, the cache area of the RDMA network interface card of the server may store a QP and a WQE that are generated based on a read/write request sent by a terminal in the terminal group, and the cache area of the RDMA network interface card of the server may be further fully utilized, to prevent the cache area of the RDMA network interface card from having excessive remaining cache space or from being sufficient, so that the cache area resources of the RDMA network interface card and the CPU resource of the server can be fully utilized.

It should be noted that the procedure shown in step 310 is a procedure in which the server processes, within any service duration, a read/write request sent by a terminal in a terminal group corresponding to the service duration without processing a read/write request sent by a terminal in a terminal group corresponding to another service duration.

311. The server stops, after the service duration corresponding to the terminal group elapses, processing a read/write request sent by a terminal in the terminal group, and stores the terminal group at an end of the wait queue.

When the server fails to process all read/write requests sent by terminals in the terminal group within the service duration corresponding to the terminal group, the server does not process a read/write request sent by a terminal in the terminal group anymore, and directly performs step 311. Only after storing the terminal group to the end of the wait queue, the server may obtain a next to-be-processed terminal group at the head of the wait queue. Therefore, the server processes, within the preset service duration, only a read/write request sent by a terminal in a terminal group corresponding to the preset service duration, to further prevent a large quantity of read/write requests from waiting for processing at the server, thereby achieving traffic limiting.

In consideration of that the server may fail to process, within any service duration, all read/write requests sent by terminals in a terminal group corresponding to the service duration on time, or process all read/write requests sent by terminals in a terminal group corresponding to the service duration in advance, to further improve utilization rates of the cache area of the network interface card and the CPU of the server, the server may adjust a service duration of each terminal group.

In a possible implementation, the server reduces the service duration corresponding to the terminal group when the service duration corresponding to the terminal group satisfies a service processing requirement of the terminal in the terminal group, and there is still a remaining duration. The server increases the service duration corresponding to the terminal group when the service duration corresponding to the terminal group does not satisfy a service processing requirement of the terminal in the terminal group. Satisfying a service processing requirement of the terminal in the terminal group means that the present processing procedure is the (preset number)$^{th}$ procedure of processing the terminal group, and in the present processing procedure, the server can complete, within the service duration corresponding to the terminal group, processing on a read/write request sent by a second terminal in the terminal group.

Specifically, an example is used, in which the server obtains the terminal group 5, a service duration assigned to the terminal group 5 is 20 minutes, the terminal group 5 includes terminals 1 to 3, and a preset quantity of times is 2. When the server can complete processing on read/write requests sent by the terminals 1 to 3 within 20 minutes after the terminal group 5 is obtained at the head of the wait queue for the first time, and there is a remaining time of 5 minutes, the server stores the terminal group 5 to the end of the wait queue. When the server can also complete processing on read/write requests sent by the terminals 1 to 3 within 20 minutes after the terminal group 5 is obtained at the head of the wait queue for the second time, and there is a remaining time of 4 minutes, the server stores the terminal group 5 to the end of the wait queue. In view of the above, after the terminal group 5 is obtained twice, when within the service duration corresponding to the terminal group 5, the server can complete, in advance each time, processing on the read/write requests sent by the terminals in the terminal group 5, the server may reduce the service duration corresponding to the terminal group 5, for example, adjust the service duration corresponding to the terminal group 5 to 16 minutes.

When the server fails to complete processing on read/write requests sent by the terminals 1 to 3 within 20 minutes after the terminal group 5 is obtained at the head of the wait queue for the first time, the server stops processing any read/write request sent by the terminals 1 to 3, and stores the terminal group 5 to the end of the wait queue. When the server also fails to complete processing on read/write requests sent by the terminals 1 to 3 within 20 minutes after the terminal group 5 is obtained at the head of the wait queue for the second time, the server stops processing any read/write request sent by the terminals 1 to 3 and stores the terminal group 5 to the end of the wait queue. In view of the above, after the terminal group 5 is obtained twice, when within the service duration corresponding to the terminal group 5, the server fails to complete processing on the read/write requests sent by the terminals in the terminal group 5, the server may properly increase the service duration corresponding to the terminal group 5, for example, adjust the service duration corresponding to the terminal group 5 to 25 minutes.

Therefore, as the server adjusts a service duration corresponding to each terminal group, the server can complete, within the adjusted duration corresponding to the terminal group, processing on a read/write request sent by a terminal in the terminal group, so that the server is not idle, thereby further improving a utilization rate of the server.

It should be noted that the server may store information about a terminal in each terminal group, and after the server is restarted, process, based on the stored information about the terminal in each terminal group, a read/write request sent by the terminal in the terminal group, so that after the server is faulty and is restarted, grouping the terminals again can be avoided. Certainly, the server may periodically store the information about a terminal in each terminal group, for example, store the information about the terminal in the terminal group every two hours, and may replace previously stored information about the terminal in the terminal group.

The server may alternatively store a priority of each terminal. The terminal is grouped based on the stored priority of the terminal after the server is restarted. Therefore, after the server is faulty and is restarted, each terminal may be grouped directly based on the stored priority of each terminal without obtaining the priority of the terminal. Certainly, the server may periodically store a priority of each terminal, for example, store a priority of each terminal every two hours, and may replace a previously stored priority of the terminal.

It should be noted that the method provided in this embodiment of the present disclosure not only may be directed to a network interface card, but also may be applicable to some scenarios in which there is a shared resource in hardware, including, but not limited to, a hard disk, for example, a scenario in which there is a shared resource in a solid state drive (SSD), a hard disk drive (HDD), or a host bus adapter (HBA) card. In addition, the method provided in this embodiment of the present disclosure not only can group terminals and assign a service duration to each terminal group, but also can be used to group software on the terminal, for example, a computer application (APP) or a virtual machine. For example, when a plurality of virtual machines send read requests to a same mirror server, the virtual machines may be grouped, or when a management process in one terminal manages read/write requests sent by a plurality of virtual machines, the plurality of virtual machines may be grouped, and a service duration is assigned for each group.

In the method provided in this embodiment of the present disclosure, each terminal is grouped, and different service durations are assigned for all terminal groups, so that the server can process, within any service duration, only a read/write request sent by a terminal in a terminal group corresponding to the service duration, so that quantities of QPs and WQEs that are generated based on the read/write request sent by the terminal in the terminal group are limited, thereby enabling a cache area of a network interface card of the server to store only limited quantities of QPs and WQEs, and further preventing a problem of uneven resource distribution from occurring in the cache area of the network interface card. In addition, by instructing terminals in a terminal group, the server can be enabled to only receive read/write requests sent by the terminals of the terminal group, to prevent the server from receiving a large quantity of read/write requests that are sent, and further prevent the large quantity of read/write requests from waiting for processing at the server, thereby achieving traffic limiting. In addition, a quantity of terminals in each terminal group is adjusted based on the cache area resources of the network interface card of the server, a CPU resource, and a priority of the terminal group, so that the cache area resources of the network interface card of the server and the CPU resource can be fully used. In addition, by monitoring a time occupied for processing a read/write request sent by a terminal in each terminal group, the server may reduce or increase a service duration of each terminal group, to prevent the cache area resources of the network interface card and the CPU resource of the server from having an idle time, thereby further maximizing utilization of the cache area resources of the network interface card and the CPU resource of the server and improving utilization rates of the cache area resources of the network interface card and the CPU resource of the server. In addition, the server does not face a problem that a large quantity of read/write requests contend for the cache of the network interface card, thereby maximizing overall performance of a system including the server and the terminal, and improving expandability of the system. In addition, when the priority is allocated to each terminal, a weight parameter is added, so that a priority of a terminal that bears an important service is higher, so that the server can focus on processing the terminal that bears an important service.

Figure 6:
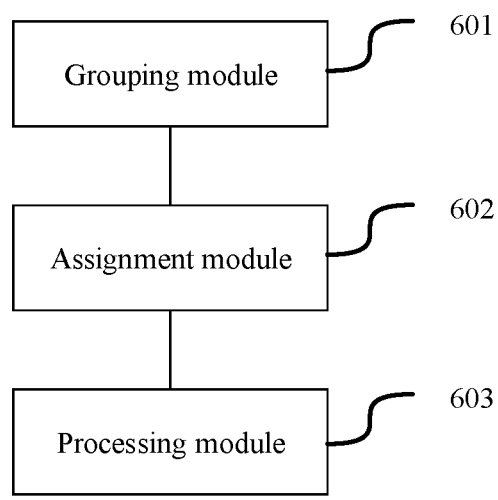
FIG. 6 is a schematic structural diagram of a read/write request processing apparatus according to an embodiment of the present disclosure.

FIG. 6 is a schematic structural diagram of a read/write request processing apparatus according to an embodiment of the present disclosure. Referring to FIG. 6, the apparatus includes:

a grouping module 601, configured to perform steps 301 to 303;

an assignment module 602, configured to perform step 305; and a processing module 603, configured to perform steps 306 to 308 and steps 310 and 311.

Optionally, the grouping module 601 includes:

a determining unit, configured to perform steps 301 and 302; and an assignment unit, configured to perform step 303.

Optionally, the determining unit includes:

an obtaining subunit, configured to perform step 301; and a determining subunit, configured to perform step 302.

Optionally, the determining subunit is configured to determine the priority of the terminal based on a weight parameter of the terminal, the throughput of the terminal, and the average data volume of the read/write requests of the terminal.

Optionally, the apparatus further includes:
a first determining module, configured to perform step 304A;
a first splitting module, configured to perform step 304B; and
a first combination module, configured to perform step 304C.

Optionally, the apparatus further includes:
a second determining module, configured to perform step 304D;
a second splitting module, configured to perform step 304E; and
a second combination module, configured to perform step 304F.

Optionally, the assignment module 602 is configured to perform step 305.

Optionally, the processing module 603 includes:
an obtaining unit, configured to perform step 307;
a processing unit, configured to perform step 310; and
a stopping unit, configured to perform step 311.

Optionally, the wait queue is configured to store each terminal group based on the priority of the terminal group.

Optionally, the apparatus further includes:
a reduction module, configured to reduce the service duration corresponding to the terminal group when the service duration corresponding to the terminal group satisfies a service processing requirement of the terminal in the terminal group and there is still a remaining duration; and
an increasing module, configured to increase the service duration corresponding to the terminal group when the service duration corresponding to the terminal group does not satisfy a service processing requirement of the terminal in the terminal group.

Optionally, the apparatus further includes:
a sending module, configured to perform step 308.

Optionally, the apparatus further includes:
a first storage module, configured to store information about a terminal in each terminal group, where
the processing module 603 is further configured to: after the server is restarted, process, based on the stored information about the terminal in each terminal group, a read/write request sent by the terminal in the terminal group.

Optionally, the apparatus further includes:
a second storage module, configured to store a priority of each terminal, where
the grouping module 601 is further configured to group the terminal based on the stored priority of the terminal after the server is restarted.

It should be noted that all modules of the apparatus may be implemented by the CPU.

Any combination of the foregoing optional technical solutions may be used to form an optional embodiment of the present disclosure. Details are not described herein again.

It should be noted that: When the read/write request processing apparatus provided in the foregoing embodiments performs read/write request processing, only division of the foregoing function modules is used as an example for description. In the practical application, the functions may be allocated to and implemented by different function modules according to requirements. That is, an internal structure of the apparatus is divided into different function modules, to implement all or some of the functions described above. In addition, the read/write request processing apparatus provided in the foregoing embodiment and the method embodiments belong to the same conception. For the specific implementation process, reference may be made to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A read/write request processing method, wherein the method is performed by a server and comprises:
receiving, within a service duration, a read/write request sent by a terminal in a terminal group corresponding to the service duration, wherein each terminal group comprises at least one terminal;
processing the read/write request sent by the terminal in the terminal group corresponding to the service duration, and skipping processing a read/write request sent by a terminal in a terminal group corresponding to another service duration;
reducing the service duration corresponding to the terminal group in response to the service duration corresponding to the terminal group satisfying a service processing requirement of the terminal in the terminal group and there being still a remaining duration; and
increasing the service duration corresponding to the terminal group in response to the service duration corresponding to the terminal group not satisfying a service processing requirement of the terminal in the terminal group.

2. The method according to claim 1, further comprising:
determining priorities of a plurality of terminals; and
assigning terminals having a same priority into one terminal group, wherein each terminal group corresponds to one priority.

3. The method according to claim 2, wherein the determining the priorities of the plurality of terminals comprises:
obtaining throughputs of the plurality of terminals within a preset time and an average data volume of read/write requests of each terminal; and
determining a priority of each terminal based on the throughput of the terminal and the average data volume of the read/write requests of the terminal.

4. The method according to claim 3, wherein the determining the priority of each terminal based on the throughput of the terminal and the average data volume of the read/write requests of the terminal comprises:
determining the priority of the terminal based on a weight parameter of the terminal, the throughput of the terminal, and the average data volume of the read/write requests of the terminal.

5. The method according to claim 2, further comprising:
determining a preset quantity of terminals of each terminal group based on a priority of the terminal group;
splitting the terminal group into a plurality of terminal groups in response to a quantity of terminals in the terminal group being greater than the preset quantity of terminals of the terminal group; and combining at least one first terminal group with the terminal group, to obtain a second terminal group, in response to the quantity of terminals in the terminal group being less than the preset quantity of terminals of the terminal group, wherein a quantity of terminals in the second terminal group is not greater than a preset quantity of terminals of the second terminal group, a priority of the second terminal group depends on priorities of terminals in the second terminal group, and a priority of the first terminal group is the same as the priority of the terminal group or a difference between the priority of the first terminal group and the priority of the terminal group is less than a preset value.

6. The method according to claim 2, further comprising: determining a maximum quantity of terminals of each terminal group based on a processing capacity of the server and a priority of the terminal group;
splitting the terminal group into a plurality of terminal groups in response to a quantity of terminals in the terminal group being greater than the maximum quantity of terminals of the terminal group; and
combining at least one third terminal group with the terminal group, to obtain a fourth terminal group in response to the quantity of terminals in the terminal group being less than the maximum quantity of terminals of the terminal group, wherein a quantity of terminals in the fourth terminal group is not greater than a maximum quantity of terminals of the fourth terminal group, a priority of the fourth terminal group depends on priorities of terminals in the fourth terminal group, and a priority of the third terminal group is the same as the priority of the terminal group or a difference between the priority of the third terminal group and the priority of the terminal group is less than a preset value.

7. The method according to claim 2, further comprising: assigning different service durations for the terminal groups based on priorities of the terminal groups by using a first preset service duration as a reference duration, wherein the assigned service durations fall within a preset range of the first preset service duration.

8. The method according to claim 1, wherein the processing, within any service duration, the read/write request sent by the terminal in the terminal group corresponding to the service duration comprises:
obtaining a to-be-processed terminal group from a wait queue based on a storage sequence in the wait queue, wherein the wait queue is used to store terminal groups;
each time a terminal group is obtained, processing a read/write request sent by a terminal in the terminal group within a service duration corresponding to the terminal group; and
stopping processing a read/write request sent by the terminal in the terminal group after the service duration corresponding to the terminal group elapses, and storing the terminal group at an end of the wait queue.

9. The method according to claim 8, wherein the wait queue is used to store each terminal group based on the priority of the terminal group.

10. The method according to claim 1, wherein before the processing, within any service duration, the read/write request sent by the terminal in the terminal group corresponding to the service duration, the method further comprises:

sending a response to the terminal in the terminal group corresponding to the service duration, wherein the response instructs the terminal to send a read/write request to the server.

11. The method according to claim 1, further comprising:
storing information about a terminal in each terminal group; and
processing a read/write request sent by the terminal in the terminal group based on the stored information about the terminal in the terminal group after the server is restarted.

12. The method according to claim 1, further comprising:
storing a priority of each terminal; and
grouping the terminal based on the stored priority of the terminal after the server is restarted.

13. A server, comprising:
a network interface card (NIC); and
a processor coupled to the NIC;
at least one of the processor and the NIC configured to:
receive, within a service duration, a read/write request sent by a terminal in a terminal group corresponding to the service duration, wherein each terminal group comprises at least one terminal;
process the read/write request sent by the terminal in the terminal group corresponding to the service duration, and skip processing a read/write request sent by a terminal in a terminal group corresponding to another service duration;
reduce the service duration corresponding to the terminal group in response to the service duration corresponding to the terminal group satisfying a service processing requirement of the terminal in the terminal group and there being still a remaining duration; and
increase the service duration corresponding to the terminal group in response to the service duration corresponding to the terminal group not satisfying a service processing requirement of the terminal in the terminal group.

14. The server according to claim 13, wherein the at least one of the processor and the NIC is further configured to:
determine priorities of a plurality of terminals; and
assign terminals having a same priority into one terminal group, wherein each terminal group corresponds to one priority.

15. The server according to claim 13, wherein the at least one of the processor and the NIC is further configured to:
obtain a to-be-processed terminal group from a wait queue based on a storage sequence in the wait queue, wherein the wait queue is used to store terminal groups;
each time a terminal group is obtained, process a read/write request sent by a terminal in the terminal group within a service duration corresponding to the terminal group; and
stop processing a read/write request sent by the terminal in the terminal group after the service duration corresponding to the terminal group elapses, and store the terminal group at an end of the wait queue.

16. The server according to claim 13, wherein the at least one of the processor and the NIC is further configured to:
store a priority of each terminal; wherein
group the terminal based on the stored priority of the terminal after the server is restarted.

\* \* \* \* \*